(12) United States Patent
Ishikawa et al.

(10) Patent No.: US 12,456,026 B2
(45) Date of Patent: Oct. 28, 2025

(54) PRINTING SYSTEM AND PRINTED MATTER PRODUCTION METHOD

(71) Applicant: SEIKO EPSON CORPORATION, Tokyo (JP)

(72) Inventors: Yuji Ishikawa, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 94 days.

(21) Appl. No.: 18/473,334

(22) Filed: Sep. 25, 2023

(65) Prior Publication Data

US 2024/0104321 A1 Mar. 28, 2024

(30) Foreign Application Priority Data

Sep. 26, 2022 (JP) ................. 2022-152409

(51) Int. Cl.
*G06K 15/02* (2006.01)
*G06F 3/12* (2006.01)

(52) U.S. Cl.
CPC ......... *G06K 15/021* (2013.01); *G06F 3/1205* (2013.01); *G06F 3/1239* (2013.01); *G06F 3/1255* (2013.01); *G06K 15/1823* (2013.01)

(58) Field of Classification Search
CPC .............. G06K 15/021; G06K 15/1823; G06F 3/1205; G06F 3/1239; G06F 3/1255; G06F 3/1285
See application file for complete search history.

(56) References Cited

U.S. PATENT DOCUMENTS

| | | | |
|---|---|---|---|
| 2005/0105146 A1* | 5/2005 | Tanaka | G03G 15/6508 358/498 |
| 2018/0285681 A1* | 10/2018 | Kubo | G06V 30/413 |
| 2020/0213473 A1* | 7/2020 | Xu | B41J 2/2054 |
| 2020/0301635 A1* | 9/2020 | Ogawa | G06F 3/1271 |
| 2021/0075928 A1* | 3/2021 | Matsuda | H04N 1/00716 |
| 2021/0271440 A1* | 9/2021 | Segawa | G06F 3/1282 |
| 2021/0405944 A1* | 12/2021 | Kawano | G06F 3/1258 |
| 2023/0359408 A1* | 11/2023 | Ghosh | G06F 3/1255 |
| 2023/0376258 A1* | 11/2023 | Yamazaki | G06F 3/1255 |

FOREIGN PATENT DOCUMENTS

| | | |
|---|---|---|
| JP | 2021-187025 A | 12/2021 |
| JP | 2022-039737 A | 3/2022 |

* cited by examiner

*Primary Examiner* — Iriana Cruz
(74) *Attorney, Agent, or Firm* — Global IP Counselors, LLP

(57) ABSTRACT

A printing system includes: a communication interface that acquires printing data from a device; a first printing mechanism that performs printing on a first medium; a second printing mechanism that performs printing on a second medium; and a processor that analyzes an image of the acquired printing data, permits printing on the first medium and printing on the second medium when it is determined that the image of the printing data is a first type image, and permits printing on the first medium and prohibits printing on the second medium when it is determined that the image of the printing data is a second type image.

10 Claims, 6 Drawing Sheets

| | POTTERY, PIN BUTTON, OR THE LIKE (FIRST MEDIUM) | PAPER (SECOND MEDIUM) |
|---|---|---|
| UNCONSTRAINED IMAGE (FIRST TYPE IMAGE) | PERMITTED | PERMITTED |
| BANKNOTE OR STOCK CERTIFICATE IMAGE (SECOND TYPE IMAGE) | PERMITTED | UNPERMITTED |
| COPY-PROHIBITED IMAGE (THIRD TYPE IMAGE) | UNPERMITTED | UNPERMITTED |
| IMAGE INCLUDING MULTIPLE PAGES (FOURTH TYPE IMAGE) | UNPERMITTED | PERMITTED |

| | POTTERY, PIN BUTTON, OR THE LIKE (FIRST MEDIUM) | PAPER (SECOND MEDIUM) |
|---|---|---|
| UNCONSTRAINED IMAGE (FIRST TYPE IMAGE) | PERMITTED | PERMITTED |
| BANKNOTE OR STOCK CERTIFICATE IMAGE (SECOND TYPE IMAGE) | PERMITTED | UNPERMITTED |
| COPY-PROHIBITED IMAGE (THIRD TYPE IMAGE) | UNPERMITTED | UNPERMITTED |
| IMAGE INCLUDING MULTIPLE PAGES (FOURTH TYPE IMAGE) | UNPERMITTED | PERMITTED |

|  | POTTERY, PIN BUTTON, OR THE LIKE (SECOND MEDIUM) | PAPER (FIRST MEDIUM) |
|---|---|---|
| UNCONSTRAINED IMAGE (FIRST TYPE IMAGE) | PERMITTED | PERMITTED |
| IMAGE INCLUDING MULTIPLE PAGES (SECOND TYPE IMAGE) | PERMITTED | UNPERMITTED |

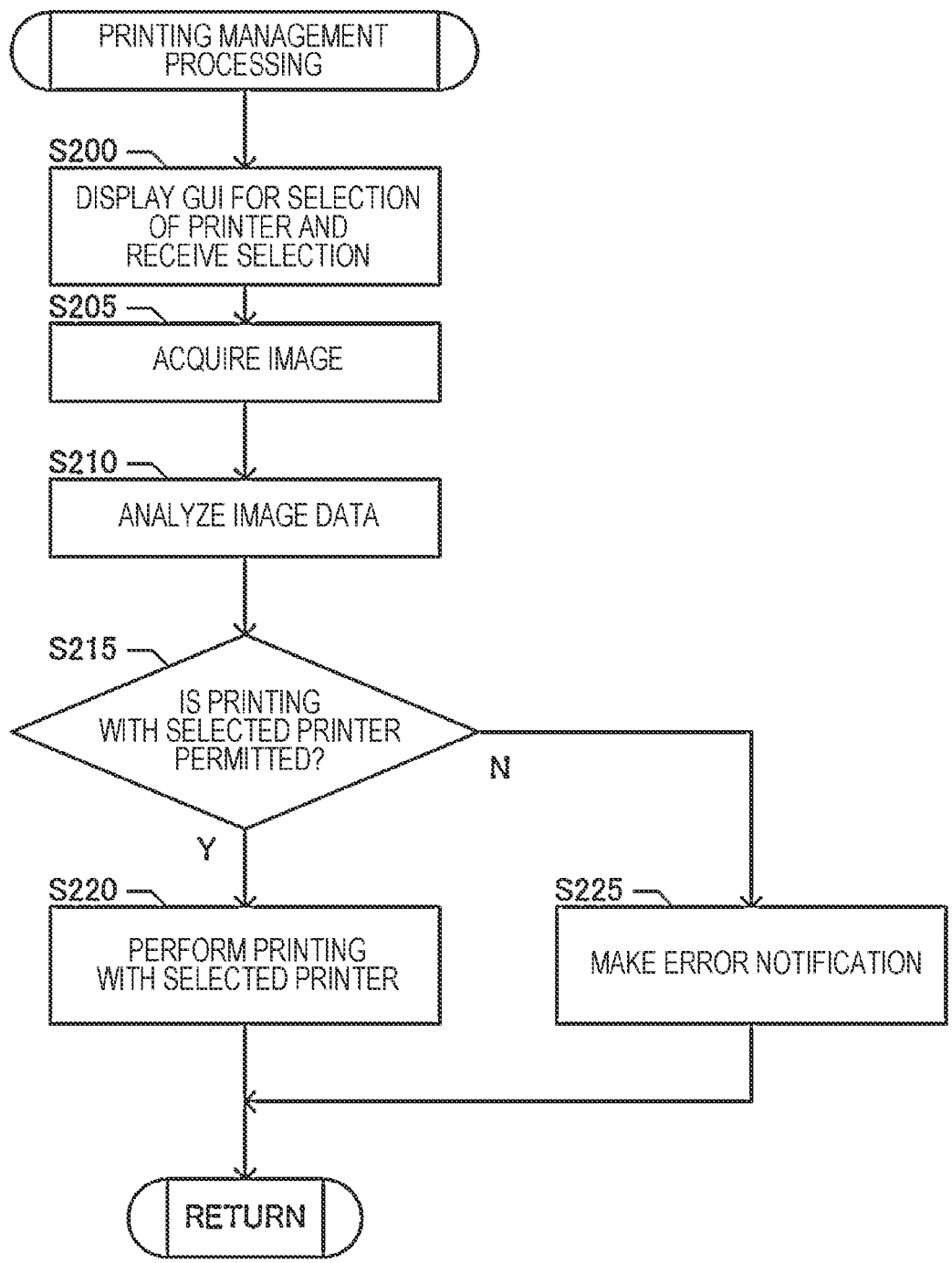

PRINTING SYSTEM AND PRINTED MATTER PRODUCTION METHOD

BACKGROUND

The present application is based on, and claims priority from JP Application Serial Number 2022-152409, filed Sep. 26, 2022, the disclosure of which is hereby incorporated by reference herein in its entirety.

1. Technical Field

The present disclosure relates to a printing system and a printed matter production method.

2. Related Art

Hitherto, technologies for performing printing on various media other than paper media have been known. For example, JP-A-2022-39737 describes printing on a surface of a can. JP-A-2021-187025 describes printing on a medium including a specular reflective layer.

However, hitherto, a plurality of types of printers that perform printing on different media are independent of each other, and cooperation between them has not been considered.

SUMMARY

According to an aspect of the present disclosure, a printing system includes: a first printing mechanism that performs printing on a first medium; a second printing mechanism that performs printing on a second medium; an acquisition unit that acquires printing data; a determination unit that analyzes an image of the acquired printing data and determines which one of a plurality of types of images that the image of the printing data corresponds to, the plurality of types of images including a first type image permitted to be printed on the first medium and the second medium and a second type image permitted to be printed on the first medium and prohibited from being printed on the second medium; and a control unit that causes the first printing mechanism or the second printing mechanism to print the printing data based on the determination result.

According to an aspect of the present disclosure, a printing method is a method of acquiring printing data and producing printed matter based on determination of which one of a plurality of types of images that an image of the acquired printing data corresponds to, the plurality of types of images including a first type image that is permitted to be printed under a first condition and a second condition, and a second type image that is permitted to be printed under the first condition and is prohibited from being printed under the second condition, in which when it is desired to print the first type image under the first condition, the printed matter is produced by performing printing based on the printing data under the first condition, when it is desired to print the first type image under the second condition, the printed matter is produced by performing printing based on the printing data under the second condition, when it is desired to print the second type image under the first condition, the printed matter is produced by performing printing based on the printing data under the first condition, and the second type image is prohibited from being printed under the second condition.

BRIEF DESCRIPTION OF THE DRAWINGS

FIG. 9 is a flowchart of printing management processing according to another embodiment.

DESCRIPTION OF EMBODIMENTS

Here, embodiments of the present disclosure will be described in the following order.
 1. Configuration of Printing System
 1-1. Configuration of Server
 1-2. Configuration of Terminal
 1-3. Configuration of Printer
 2. Printing Management Processing
 3. Other Embodiments

1. Configuration of Printing System

Figure 1:
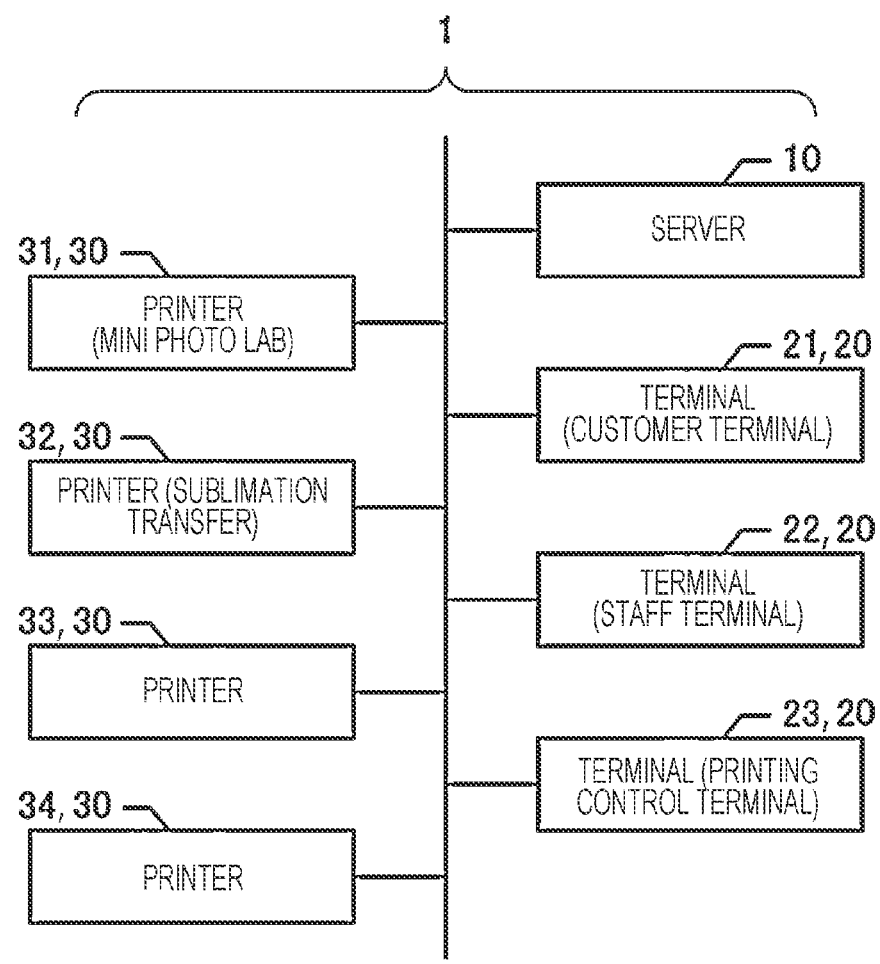
FIG. 1 is a block diagram of a printing system.

FIG. 1 is a diagram schematically illustrating an example of a printing system according to an embodiment of the present disclosure. A printing system 1 includes a server 10, terminals 20, and printers 30. The number of devices illustrated is only an example, and the number of devices is not limited thereto. For example, the number of terminals 20 or printers 30 described as being plural is not limited to the number illustrated in FIG. 1, and the number of servers 10 described as being singular may be plural. These devices can communicate with each other via a network. The network may take various forms, including a local network, or devices physically separated from each other may communicate with each other via the Internet or the like.

The plurality of printers 30 can perform printing on different types of media, respectively. In the present embodiment, the printers 30 include a printer 31 (mini photo lab machine) suitable for printing on photographic paper, a printer 32 (sublimation transfer printer) that can perform printing on sublimation transfer paper to be pressure-bonded to mugs (pottery), pin buttons, and smartphone cases, a printer 33 (large-format printer) suitable for printing on large-sized paper media such as posters, and a printer 34 (direct to garment (DTG) printer) that can perform printing directly on fabric products such as T-shirts.

In the present embodiment, the printers 32 and 34, which are a sublimation transfer printer and a DTG printer, respectively, correspond to first printing mechanisms, and the printers 31 and 33 that perform printing on paper media correspond to second printing mechanisms. That is, a printer that prints an image for a product which is not paper, on which the image is formed, and which is finally delivered to a customer is the first printing mechanism according to the present embodiment, and a printer that prints an image for a product which is paper, on which the image is formed, and which is finally delivered to a customer is the second printing mechanism according to the present embodiment.

In the present embodiment, the terminals 20 and the printers 30 are installed in a store such as a photo studio or a general store, as an example. The terminals 20 include a terminal used by a customer who visits the store (customer terminal 21), a terminal used by a store staff (staff terminal 22), and a terminal (printing control terminal 23) in which a printer driver for each printer 30 is installed. It is a matter of course that at least two of the terminals 20 may be implemented by the same device. At the store, a service of printing an image designed using a picture or the like designated by a customer on a medium (for example, a mug, a T-shirt, a smartphone case, a pin button, or paper sheets of various sizes and materials) selected by the customer and producing souvenirs or original goods for the customer.

Figure 2:
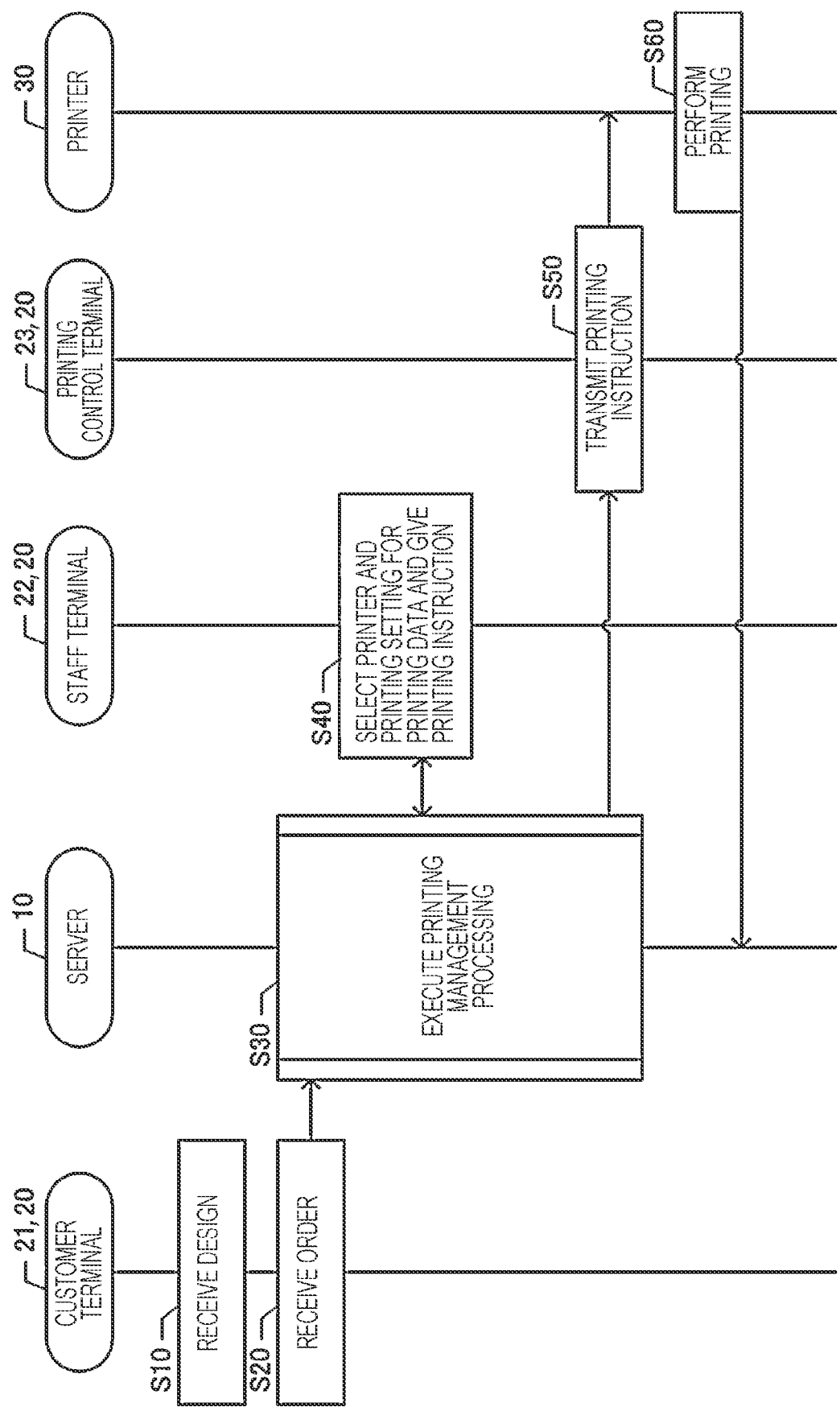
FIG. 2 is a sequence diagram illustrating a flow of overall processing.

FIG. 2 is a sequence diagram illustrating a general flow of the service. The customer operates the customer terminal 21 and designs an image to be printed on a medium by using a design application installed in the customer terminal 21, and the customer terminal 21 receives the design (step S10). Specifically, the customer selects a template for the medium by using the design application. Further, the customer designates a picture desired by the customer by using the design application, and designs the image to be printed on the medium by using the template. The customer can transfer, for example, a picture stored in his/her mobile terminal to the customer terminal 21 and designate the transferred picture. The customer can select the type, material, color, shape, or the like of the medium while consulting with a staff as necessary. When the customer designates the number of copies and places an order to print the image designed by the customer on the selected medium, the customer terminal 21 accepts the order (step S20). The customer terminal 21 transmits printing data indicating a content of the order from the customer terminal 21 to the server 10. The printing data includes the image to be printed on the medium selected by the customer, information regarding the number of copies, and the like.

After receiving the printing data, the server 10 executes printing management processing described below (step S30). The printing data is accumulated in a recording medium of the server 10. The staff can refer to the progress of the printing data accumulated in the server 10 by operating the staff terminal 22. In addition, the staff selects a printer 30 to perform printing for unprinted printing data, selects a printing setting to be used for the printing of the printing data from a list of printing settings prepared in advance, and gives an instruction for printing with the selected printer 30 to the server 10 (step S40). Upon receiving the printing instruction from the staff terminal 22, the server 10 transmits a printing instruction for the selected printer 30 to the printing control terminal 23. Identification information of an output destination printer, the image to be printed, the number of copies, and the printing setting are transferred from the server 10 to the printing control terminal 23. The printing control terminal 23 receives the printing instruction from the server 10 and transmits the printing instruction to the designated printer 30 (step S50). That is, the printing control terminal 23 converts, by using the printer driver, the image into data in a format suitable for printing with the designated printer 30 based on the printing setting, and transmits the data to the printer 30. The printer 30 performs printing based on the data transmitted from the printing control terminal 23 (step S60). The printer 30 transmits printing progress information to the server 10 via the printing control terminal 23.

As for the printer 30 that requires a post-printing process, a post-process device is also installed in the store. For example, various types of presses such as a flatbed press (not illustrated) for transferring an image on sublimation transfer paper to a flat surface such as a T-shirt, a mug press for transferring an image to a surface of a cylindrical object such as a mug, and a press for transferring an image to a smartphone case are also installed in the store for the sublimation transfer printer. The staff can use these presses to transfer an image onto a medium and obtain a product on which an image designed by the customer is formed. The customer can immediately receive the product at the store where the customer designed the image and placed the order.

Figures 3, 4:
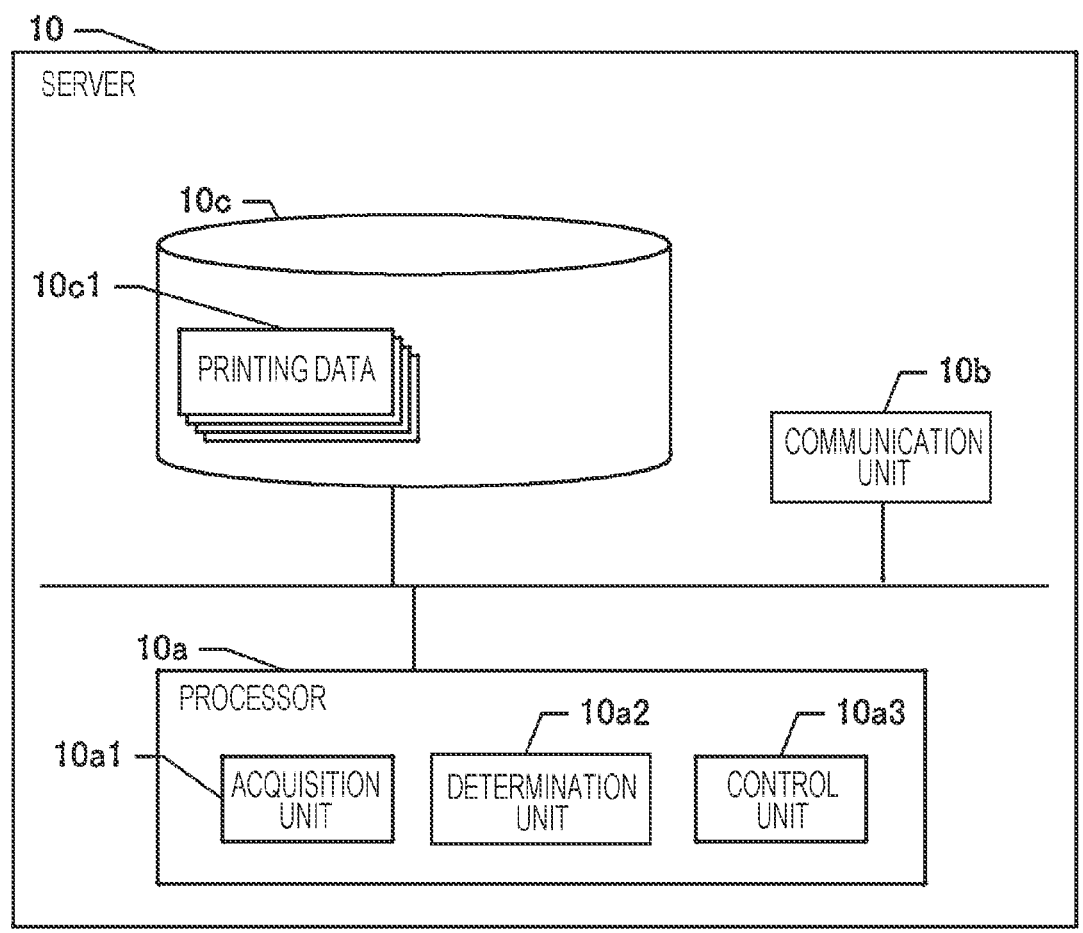
FIG. 3 is a diagram illustrating a relationship between a type of an image and printability on a medium.
FIG. 4 is a block diagram illustrating a configuration of a server.

By the way, the image selected by the customer for printing may be unsuitable for printing on a specific medium. For example, as illustrated in FIG. 3, it is prohibited by law to perform printing of an image such as a banknote image or a stock certificate image on a paper medium, because this may be considered forgery. However, it is not prohibited to perform printing of an image such as a banknote image or a stock certificate image on, for example, pottery or a pin button other than paper, because this is not considered forgery. Further, for example, an image including multiple pages, such as a calendar, is not suitable for printing on pottery or a pin button, but is suitable for printing on a paper medium. In addition, for example, a copy-prohibited image such as a copyrighted image is not suitable for printing on any medium.

As described above, there may be restrictions on the selection of an output destination printer depending on the content of the image data. When the staff member mistakenly selects, as a printing destination printer 30 for printing data, a printer 30 that should not be selected, a printing error occurs and the medium is wasted, or such selection results in a violation of the law. Therefore, the printing system 1 implements a function of analyzing an image of printing data, determining the type of the image, and performing printing according to the determination result.

1-1. Configuration of Server

Hereinafter, a configuration of each device of the printing system 1 for implementing such a function will be described. FIG. 4 is a block diagram illustrating a configuration of the server 10. The server 10 includes a processor 10a, a communication unit 10b, and a non-volatile memory 10c. The processor 10a includes a central processing unit (CPU), a read only memory (ROM), a random access memory (RAM), and the like (not illustrated), and can execute various programs recorded in the non-volatile memory 10c to control each unit of the server 10 and each device connected to the network. The processor 10a may be configured with a single chip, may be configured with a plurality of chips, or may be configured as a system-on-chip (SoC) together with various functional blocks that operate the printer. Further, for example, an application specific integrated circuit (ASIC) may be employed instead of the CPU, or a configuration in which the CPU and the ASIC cooperate with each other may be employed. When each device according to the present embodiment includes a processor, the processor can be implemented in various forms like the processor 10a.

The communication unit 10b includes a communication interface for communicating with an external device according to various wired or wireless communication protocols. The server 10 can communicate with other devices via the communication unit 10b. The communication unit 10b may include an interface for communicating with various removable memories mounted on the server 10.

Various types of information are accumulated in the non-volatile memory 10c of the server 10. For example, the non-volatile memory 10c includes printing data 10c1. The printing data 10c1 includes an image to be printed on a medium and the number of copies to be printed.

In the present embodiment, the processor 10a functions as an acquisition unit 10a1 that acquires the printing data 10c1 from. Further, the processor 10a analyzes the image to be printed included in the printing data 10c1 and functions as a determination unit 10a2 that determines which one of a plurality of types of images including a first type image and a second type image that the image of the printing data corresponds to. The processor 10a also functions as a control unit 10a3 that causes printing to be performed based on the determination result. Details thereof will be described below.

1-2. Configuration of Terminal

Figure 5:
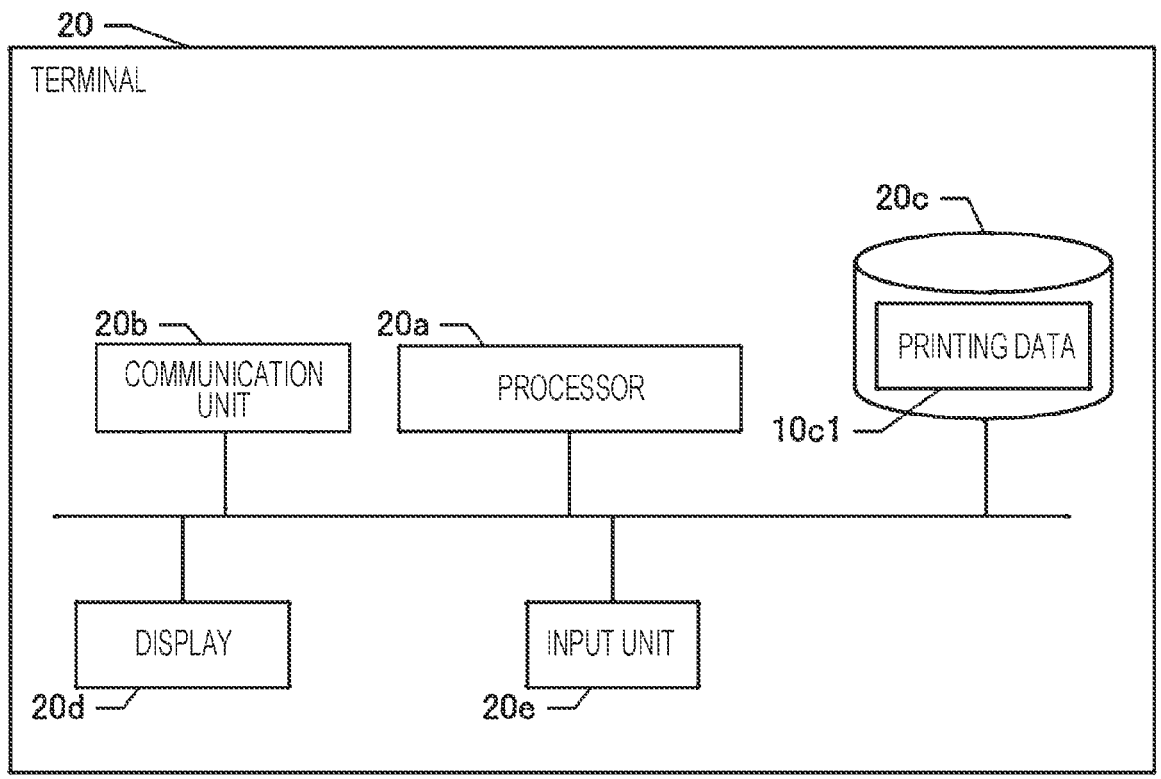
FIG. 5 is a block diagram illustrating a configuration of a terminal.

FIG. 5 is a block diagram illustrating a configuration of terminal 20. The terminal 20 includes a processor 20a, a communication unit 20b, a non-volatile memory 20c, a display 20d, and an input unit 20e. The processor 20a includes a CPU, a ROM, a RAM, and the like (not illustrated), and can execute various programs recorded in the non-volatile memory 20c to control each unit of the terminal 20.

The communication unit 20b includes a communication interface for communicating with an external device according to various wired or wireless communication protocols. The terminal 20 can communicate with other devices via the communication unit 20b. The communication unit 20b may include an interface for communicating with various removable memories mounted on the terminal 20.

The display 20d is a display device that displays any image. The input unit 20e is a device for a user to perform an input operation, and is implemented by, for example, a keyboard, a mouse, or a touch panel. In any case, the user (the customer or staff) can operate the input unit 20e to input a user's intention while viewing an image or text displayed on the display 20d.

In the customer terminal 21, the printing data 10c1 is recorded in the non-volatile memory 20c. The customer operates the customer terminal 21 to select a template and designate an image according to the type of the medium, design the image by arranging the image on the template and applying other decorations or the like, designate the number of copies to be printed, and place an order. The printing data 10c1 indicating the order is transferred to the server 10. The printing data 10c1 may be temporarily stored in a volatile memory of the customer terminal 21, transferred to the server 10, and stored in the non-volatile memory 10c of the server 10 for a long term.

The staff can operate the staff terminal 22 to view the printing data 10c1 stored in the server 10 via a website provided by the server 10. In addition, the staff selects the printer 30 for printing the printing data 10c1 stored in the server 10 via the website, selects a printing setting to be used for the printing of the printing data from a list of printing settings prepared in advance, and instructs the selected printer 30 to perform printing.

When the printing control terminal 23 receives a printing instruction from the server 10 via the communication unit 20b, the printing control terminal 23 converts an image of printing data into a printing format for a designated printer based on a designated printing setting by using the printer driver, and outputs the converted data to the printer 30 together with information regarding the number of copies.

1-3. Configuration of Printer

Figure 6:
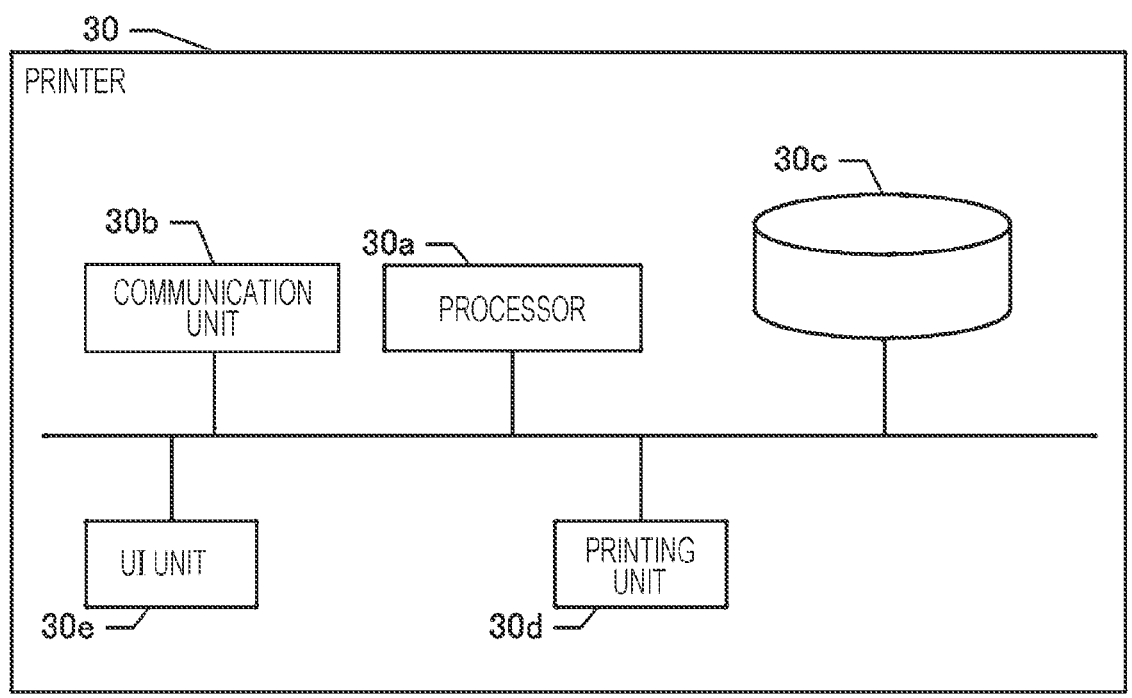
FIG. 6 is a block diagram illustrating a configuration of a printer.

FIG. 6 is a block diagram illustrating a configuration of the printer 30. The printer 30 includes a processor 30a, a communication unit 30b, a non-volatile memory 30c, a printing unit 30d, and a user interface (UI) unit 30e. The processor 30a includes a CPU, a ROM, a RAM, and the like (not illustrated), and can execute various programs recorded in the non-volatile memory 30c to control each unit of the printer 30.

The communication unit 30b includes a communication interface for communicating with an external device according to various wired or wireless communication protocols. The printer 30 can communicate with other devices via the communication unit 30b. The communication unit 30b may include an interface for communicating with various removable memories mounted on the printer 30.

The printing unit 30d is a part that performs printing, and performs printing on various media including plain paper, photographic paper, sublimation transfer paper, fabric, and the like by using various printing methods such as an ink jet method. The printing unit 30d includes an actuator, various devices, a sensor, a drive circuit, a mechanical part, and the like for performing printing on various media. The sensor includes a sensor that detects various detection targets that can change in the printer 30. The detection target is not limited, and examples of the sensor include a sensor that detects the remaining amount of media and a sensor that detects the remaining amount of ink of each color used for printing.

The UI unit 30e includes a touch panel display, various keys and switches, and the like. The touch panel display includes a display panel that displays various types of information, such as the status of the printer 30 and the remaining amount of ink, and a touch detection panel overlapping with the display panel, and detects a touch operation. The processor 30a can acquire a content of an operation made by the staff via the UI unit 30e. In addition, the processor 30a can display various types of information on a display of the UI unit 30e and notify the staff.

In the present embodiment, the plurality of printers 30 are installed in a store such as a photo studio or general store, and printing is performed according to an order from the customer and a printing instruction from the staff. The processor 30a of the printer 30 acquires data converted into a printing format for the printer 30 via the communication unit 30b, controls the printing unit 30d based on the data, and performs printing. When the printing ends, the processor 30a outputs information indicating that the printing has ended via the communication unit 30b. When the server 10 acquires the information via the communication unit 10b, the processor 10a of the server 10 updates the progress status of the printing data 10c1 for which printing has ended to "finished".

2. Printing Management Processing

Figures 7, 8:
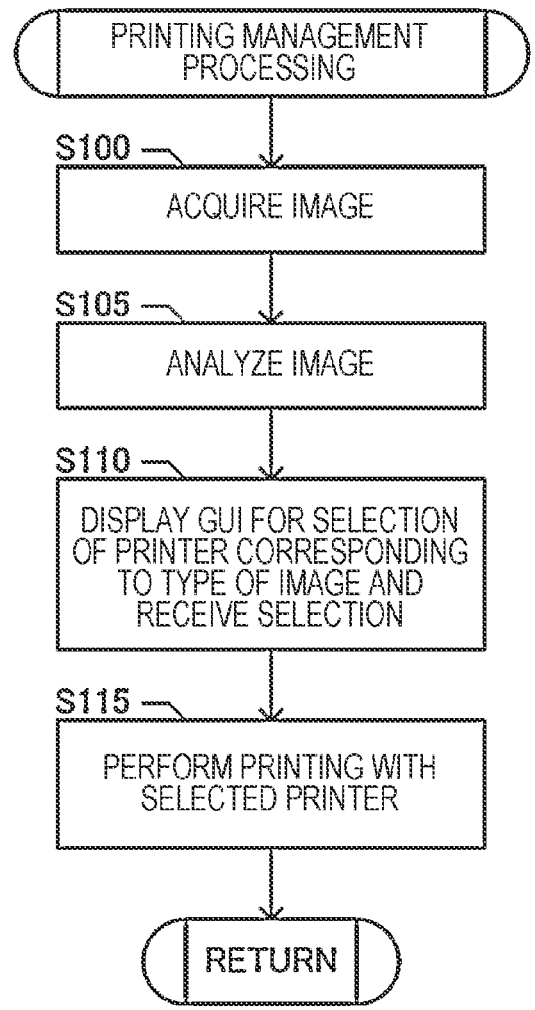
FIG. 7 is a flowchart of printing management processing.
FIG. 8 is a diagram illustrating a relationship between a type of an image and printability on a medium according to another embodiment.

FIG. 7 is a flowchart of the printing management processing according to the present embodiment. The printing management processing of FIG. 7 is processing corresponding to S30 in the sequence of FIG. 2, and is executed by the processor 10a of the server 10 in the present embodiment. In the present embodiment, when the printing data 10c1 is received from the customer terminal 21, the processor 10a executes the printing management processing illustrated in FIG. 7.

When the printing management processing starts, the processor 10a acquires an image by using the function of the acquisition unit 10a1 (step S100). That is, the processor 10a acquires the image to be printed included in the printing data 10c1. Then, the processor 10a analyzes the image by using the function of the determination unit 10a2 (step S105). That is, in the present embodiment, the processor 10a determines whether the image is the first type image, the second type image, a third type image, or a fourth type image.

The first type image is an image that is permitted to be printed on a first medium and a second medium. For example, in the present embodiment, as illustrated in FIG. 3, it is assumed that the first medium is pottery such as a mug or a pin button, and the second medium is paper. The first type image is assumed to be an unconstrained image unlike the second type image, the third type image, and the fourth type image, which will be described below. The second type image is an image that is permitted to be printed on the first medium and prohibited from being printed on the second medium. In the present embodiment, the second type image is a banknote or a stock certificate. The processor 10a determines whether or not the image is a banknote by using known banknote identification techniques. Further, for example, the processor 10a determines whether or not the image is a stock certificate by pattern matching using a pattern representing characteristics of the stock certificate.

The third type image is an image that is prohibited from being printed on the first medium and is also prohibited from being printed on the second medium. In the present embodiment, the third type image is a copy-prohibited image such as a copyrighted image. The processor 10a determines whether the image is a copyrighted image by using, for example, a learning model trained using copyrighted images. Alternatively, the processor 10a determines whether or not the image contains data indicating copy prohibition.

The fourth type image is an image that is prohibited from being printed on the first medium and permitted to be printed on the second medium. In the present embodiment, the fourth type image is an image including multiple pages such as a calendar. Since it is assumed that an image of one page is printed on each sheet of sublimation transfer paper to be press-bonded to a mug or a pin button, an image including multiple pages is regarded as being not suitable for printing on the sublimation transfer paper in the present embodiment. The processor 10a determines whether or not the image includes multiple pages. In this manner, the processor 10a determines which one of the first to fourth type images that the image corresponds to.

After finishing the image analysis in step S105, when printing data to be processed is selected by the staff via the staff terminal 22 (step S40 in FIG. 2), the processor 10a displays a graphical user interface (GUI) for selection of a printer according to the type of the image to receive selection from the user (staff) (step S110). That is, the processor 10a specifies a medium for which printing of the specified type of image is permitted, based on a correspondence illustrated in FIG. 3, and specifies a printer for printing on the specified medium. Then, the processor 10a transmits, to the staff terminal 22, display data including the GUI with the specified printer as an option. The specified printer option is presented to the staff terminal 22 based on the display data. For example, when the image is the second type image, the printers 32 and 34 whose product on which the image is formed and which is finally delivered to the customer is not paper are presented as options. The printers 31 and 33 whose product on which the image is formed and which is finally delivered to the customer is paper are not presented as options (or are displayed grayed out in an unselectable manner). The staff can select a printer from the options presented in a selectable manner. Further, when the staff selects a print setting and performs a printing instruction operation, the processor 10a acquires the printing instruction from the staff terminal 22 via the communication unit 10b. The processor 10a causes the printer selected in step S110 to perform printing by using the function of the control unit 10a3 (step S115). That is, the processor 10a transmits the identification information of the selected printer, the print setting, and the printing data 10c1 to the printing control terminal 23 via the communication unit 10b (step S50 in FIG. 2).

As described above, according to the present embodiment, in a system that links and manages various printers that perform printing on different types of media, it is possible to analyze an image of printing data and cause a printing mechanism to perform printing according to a content of the image. Therefore, it is possible to make a printing failure less likely to occur.

3. Other Embodiments

The above-described embodiment is merely an example for carrying out the present disclosure, and various other embodiments can be employed. For example, in the above-described embodiment, an example in which four printers are installed in a store has been illustrated, but it is not necessary that all the printers of these types are installed. Further, the types of printers illustrated in the above-described embodiments are merely examples, and printers capable of performing printing on various other media may also be employed. It is sufficient if each of the first printing mechanism and the second printing mechanism is at least one printer. Further, a plurality of printing mechanisms may be provided in one printer. In addition to the sublimation transfer method, a printer that directly performs printing on a three-dimensional object by using a robot arm or the like may be used for printing on pottery, a pin button, a smartphone case, or the like.

The printing control terminal 23 may be omitted, and data may be communicated between the printer and the server without going through the printing control terminal 23. A configuration in which the terminals and the printers are not installed in stores visited by customers may also be assumed. The terminal may be installed in a store, the printer may be installed in a printing facility of a printing company, and the printed matter may be delivered from the printing facility to a client. Alternatively, the terminal does not have to be installed in a store, and the user can place an order, edit printing data, and give a final printing instruction at various locations by using a portable terminal.

In the acquisition unit, the printing data may be acquired in any manner. For example, printing data created by a client who requested production of printed matter may be transferred to the printing system via the network, or may be recorded in a removable memory and transferred from the removable memory to the printing system. The client may create the printing data with the application program or the like by using the terminal included in the printing system. It is a matter of course that the printing data created by the client may be edited by a user other than the client, and the edited printing data may be acquired.

The processing in the determination unit may be executed by an arbitrary trigger between the acquisition of the printing data and the printing of the printing data. For example, the determination unit may perform determination of the type of the image in response to the acquisition of the printing data by the acquisition unit. The processing in the determination unit may be executed when the user selects the printing data to confirm details of the printing data. Alternatively, the processing in the determination unit may be executed when the user instructs printing of the printing data.

The method of image analysis in the determination unit, the number of image classifications, and the types of images permitted to be printed and prohibited from being printed can be designed as appropriate, and are not limited to the above-described embodiment. It is sufficient if the first type image is an image that is permitted to be printed on both the first medium and the second medium. It is sufficient if the second type image is an image that is permitted to be printed on one of the media and is prohibited from being printed on the other medium. The medium on which the second type image is permitted to be printed and the medium on which the second type image is not permitted to be printed may differ depending on the characteristics of the second type image. For example, in the above-described embodiment, as illustrated in FIG. 3, an image including multiple pages is classified as the fourth type image, and printing of the fourth type image on paper as the second medium is permitted, and printing the fourth type image on pottery or a pin button as the first medium is prohibited. Focusing only on a relationship with the first type image, which has no restrictions on a printing destination, an image including multiple pages can also be regarded as the second type image as illustrated in FIG. 8. That is, in such a case, paper corresponds to the first medium, and pottery and a pin button correspond to the second medium. Further, in countries where printing of a banknote image, a stock certificate image, or the like is prohibited even on pottery or a pin button, the banknote image, the stock certificate image, or the like needs to be classified as the third type image.

In the determination unit, the type of the image may be determined based on an object included in the image as described above, or the type of the image may be determined based on the shape of the image. For example, when the image has an annular shape representing a compact disc (CD) label, the DTG printer may be excluded from output destination printer options, or the user may be asked to confirm whether or not to allow printing with the DTG printer.

The control unit only needs to be able to cause or not to cause printing to be performed based on the determination result of the determination unit. As in the above-described embodiment, the options are narrowed down to the printing mechanisms corresponding to the media for which printing of the specified type of image is permitted by the determination unit (printing mechanisms for unpermitted media are excluded from the options), and the user may select a printing mechanism from the options.

Alternatively, as illustrated in FIG. 9, whether or not printing with the printing mechanism selected by the user is possible may be determined, and a notification of the determination result may be made.

FIG. 9 is a flowchart of printing management processing according to another embodiment. The printing management processing of FIG. 9 is executed, for example, when the staff starts an operation for printing the printing data accumulated in the server 10. When the printing management processing starts, the processor 10a displays a GUI for selection of a printer and receives selection from the user by using the function of the control unit 10a3 (step S200). That is, at this stage, all the printers installed in the store, for example, are presented as options without restrictions based on the type of the image. Then, the processor 10a acquires an image by using the function of the acquisition unit 10a1 (step S205), and analyzes the image by using the function of the determination unit 10a2 (step S210). That is, it is determined to which type the image to be printed included in the printing data is classified.

The processor 10a determines whether or not the image acquired in step S205 is permitted to be printed by the printer selected in step S200 by using the function of the control unit 10a3 (step S215), and when it is determined that the image is permitted to be printed, the processor 10a causes the selected printing destination to perform printing (step S220). When it is determined that the image is not permitted to be printed, the processor 10a notifies of an error by using the function of the control unit 10a3 (step S225). That is, the processor 10a notifies that printing cannot be performed because the selected printer is not permitted to print the image of the printing data. After step S225, options of the printers capable of printing the image may be presented.

The present disclosure can also be applied as a printed matter production method when a condition for permitting printing is determined according to the type of an image. The printed matter production method is a method of producing printed matter based on a determination result indicating which one of a plurality of types of images that an image of printing data corresponds to, the plurality of types of images including a first type image that is permitted to be printed under a first condition and a second condition, and a second type image that is permitted to be printed under the first condition and is prohibited from being printed under the second condition. In the printed matter production method, when it is desired to print the first type image under the first condition, printing based on the printing data is performed under the first condition to produce the printed matter, and when it is desired to print the first type image under the second condition, printing based on the printing data is performed under the second condition to produce the printed matter (that is, the first type image can be printed under either the first condition or the second condition). When it is desired to print the second type image under the first condition, printing based on the printing data is performed under the first condition to produce the printed matter, and printing the second type image under the second condition is prohibited (the second type image is printable under the first condition and is not printable under the second condition).

For example, when the second type image is a banknote image, the first condition is printing on pottery or a pin button, and the second condition is printing on paper. In other words, a banknote image is prohibited from being printed on a paper medium, but can be printed on pottery or a pin button. Further, for example, when the second type image is a calendar image, the first condition is printing on paper, and the second condition is printing on pottery or a pin button.

The "first condition" and "second condition" may also assume printing conditions other than the designation of the type of the printing medium as described above. For example, the second condition may be a predetermined printing resolution and a predetermined printing size, and the first condition may be other printing resolutions and other printing sizes (that is, there is no limit to the printing resolution or printing size). When printing with a resolution (the predetermined resolution) that is significantly different from the resolution of the image or printing with a size (the predetermined printing size) that is significantly different from the size of the medium that is suitable for the resolution of the image is desired as the printing condition (second condition), printing under such a condition may be prohibited. For example, an image with a resolution intended for printing on an A4-sized medium is permitted to be printed on an A4-sized medium or an A5-sized medium. An image with a resolution intended for printing on an A3-sized medium is permitted to be printed on an A4-sized medium and is prohibited from being printed on an A5-sized medium. Alternatively, an image with a resolution intended to be printed on a small medium such as a pin button is prohibited from being printed in a large printing size such as A1.

Furthermore, the present disclosure can also be applied as a computer-executable program or method. The above-described system, program, and method may be implemented as a single device or may be implemented by using components included in a plurality of devices, and thus the system, program, and method include various aspects. The present disclosure can be appropriately modified. For example, the present disclosure is partially implemented by software and partially implemented by hardware. Furthermore, the present disclosure can also be applied as a recording medium of a program that controls the system. It is a matter of course that the recording medium of the program may be a magnetic recording medium, a semiconductor memory, or any recording medium to be developed in the future.

What is claimed is:

1. A printing system comprising:
a communication interface that acquires printing data from a device;
a first printing mechanism that performs printing on a first medium;
a second printing mechanism that performs printing on a second medium; and
a processor that determines whether an image of the printing data is a first type image or a second type image by analyzing whether the image of the printing data contains a predetermined object or by analyzing whether the image of the printing data is a multiple-page image, permits printing on the first medium and printing on the second medium when it is determined that the image of the printing data is the first type image, and permits printing on the first medium and prohibits printing on the second medium when it is determined that the image of the printing data is the second type image.

2. A printing system comprising:
a communication interface that acquires printing data from a device:
a first printing mechanism that performs printing on a first medium;
a second printing mechanism that performs printing on a second medium; and
a processor that analyzes an image of the printing data, permits printing on the first medium and printing on the second medium when it is determined that the image of the printing data is a first type image, and permits printing on the first medium and prohibits printing on the second medium when it is determined that the image of the printing data is a second type image, wherein
the first medium is pottery or a pin button,
the second medium is paper, and
the processor determines that the image is the second type image when the image is a banknote image.

3. The printing system according to claim 1, wherein
the first medium is paper,
the second medium is pottery or a pin button, and
the processor determines that the image is the second type image when the image is a calendar image.

4. The printing system according to claim 1, wherein
the processor determines which one of a plurality of types of images that the image corresponds to, the plurality of types of images including the first type image, the second type image, and a third type image that is prohibited from being printed on the first medium and the second medium.

5. The printing system according to claim 1, wherein
the processor determines which one of a plurality of types of images that the image corresponds to, the plurality of types of images including the first type image, the second type image, and a fourth type image that is prohibited from being printed on the first medium and is permitted to be printed on the second medium.

6. A printing method of acquiring printing data and performing printing based on a determination result indicating which one of a plurality of types of images including a first type image and a second type image that an image of the printing data corresponds to, the printing method comprising:
determining whether the image of the printing data is the first type image or the second type image by analyzing whether the image of the printing data contains a predetermined object or by analyzing whether the image of the printing data is a multiple-page image;
permitting printing of the first type image under a first condition;
permitting printing of the first type image under a second condition;
permitting printing of the second type image under the first condition; and
prohibiting printing of the second type image under the second condition.

7. The printing method according to claim 6, wherein
the first condition is printing on pottery or a pin button,
the second condition is printing on paper, and
the second type image is a banknote image.

8. The printing method according to claim 6, wherein
the first condition is printing on paper,
the second condition is printing on pottery or a pin button, and
the second type image is a calendar image.

9. The printing method according to claim 6, wherein
the second condition is a predetermined printing resolution and a predetermined printing size, and
the first condition is other printing resolutions and other printing sizes.

10. A non-transitory computer-readable storage medium storing a printing control program acquiring printing data and causing a printing device to print an image of the printing data based on a determination result indicating which one of a plurality of types of images including a first type image and a second type image that the image of the printing data corresponds to, wherein
the printing device is caused to determine whether the image of the printing data is the first type image or the second type image by analyzing whether the image of the printing data contains a predetermined object or by analyzing whether the image of the printing data is a multiple-page image,
the printing device is caused to print the image of the printing data under a first condition when it is desired that the first type image is printed under the first condition, the printing device is caused to print the image of the printing data under a second condition when it is desired that the first type image is printed under the second condition, the printing device is caused to print the image of the printing data when it is desired that the second type image is printed under the first condition, and the printing device is not caused to print the second type image under the second condition.

\* \* \* \* \*